US009102548B2

(12) United States Patent
Prins

(10) Patent No.: US 9,102,548 B2
(45) Date of Patent: Aug. 11, 2015

(54) PURIFIER COMPRISING A SOLIDS SEPARATION DEVICE, AND METHOD FOR WASTEWATER PURIFICATION

(75) Inventor: Rienk Prins, Elahuizen (NL)

(73) Assignee: Paques. I.P. B.V., Balk (NL)

( * ) Notice: Subject to any disclaimer, the term of this patent is extended or adjusted under 35 U.S.C. 154(b) by 398 days.

(21) Appl. No.: 13/808,644

(22) PCT Filed: Jul. 8, 2011

(86) PCT No.: PCT/NL2011/050500
§ 371 (c)(1),
(2), (4) Date: Apr. 5, 2013

(87) PCT Pub. No.: WO2012/005592
PCT Pub. Date: Jan. 12, 2012

(65) Prior Publication Data
US 2013/0206684 A1   Aug. 15, 2013

(30) Foreign Application Priority Data
Jul. 8, 2010 (EP) ..................................... 10168907

(51) Int. Cl.
*C02F 3/28* (2006.01)
*C02F 3/02* (2006.01)
*C02F 3/12* (2006.01)

(52) U.S. Cl.
CPC ............ *C02F 3/2846* (2013.01); *C02F 3/1226* (2013.01)

(58) Field of Classification Search
CPC .............................. C02F 3/2846; C02F 3/1226
USPC .......... 210/603, 620, 622, 188, 252, 259, 260
See application file for complete search history.

(56) References Cited

U.S. PATENT DOCUMENTS

2002/0162795 A1* 11/2002 Pollock .......................... 210/621

FOREIGN PATENT DOCUMENTS

EP    0 493 727 A1    7/1992
WO    2007/058557 A2  5/2007

OTHER PUBLICATIONS

International Search Report for International Application No. PCT/NL2011/050500, mailed Dec. 20, 2011.
International Preliminary Report on Patentability for International Application No. PCT/NL2011/050500, mailed Jul. 27, 2012.

* cited by examiner

*Primary Examiner* — Fred Prince
(74) *Attorney, Agent, or Firm* — Hoffmann & Baron, LLP

(57) ABSTRACT

The invention relates to a purifier (100) for the purification of a fluid such as wastewater, the purifier comprising:—a reaction vessel (10) for a fluid, the reaction vessel having a reaction chamber (11) and a bottom (12);—a downer (14) having a top end (91) and a bottom end (92), wherein the top end of the downer is connected to a fluid collector (13) to collect fluid from the reaction vessel (10), and the downer is arranged to transport the fluid towards the bottom (12) of the reaction vessel;—a solids separation device (20) arranged to separate solids from liquid, the solids separation device comprising a fluid inlet (72) arranged to introduce fluid into the solids separation device and a liquid discharge (56) arranged to remove separated liquid from the solids separation device; wherein the fluid inlet of the solids separation device (20) is connected to the bottom end (92) of the downer and the solids separation device is located on or near the bottom (12) of the reaction vessel.

12 Claims, 7 Drawing Sheets

PURIFIER COMPRISING A SOLIDS SEPARATION DEVICE, AND METHOD FOR WASTEWATER PURIFICATION

CROSS-REFERENCE TO RELATED APPLICATIONS

The present application is the National Stage filing of International Application No. PCT/NL2011/050500, filed Jul. 8, 2011, which claims the benefit of EP 10168907.3 filed Jul. 8, 2010, the entire contents of all of which are incorporated by reference herein.

FIELD OF THE INVENTION

The invention relates to a purifier comprising a solids separation device. The invention also relates to a method for the purification of wastewater. A fluid is considered a wastewater if it has biologically degradable components.

BACKGROUND OF THE INVENTION

Such purifiers comprising a solids separation device are known from the prior art. An example purifier is disclosed in EP 2 065 344 A1. Upflow anaerobic sludge blanket (UASB) wastewater treatment is a process that generally employs a reactor having a reaction vessel that comprises a bed of granular anaerobic sludge. Influent wastewater is evenly distributed beneath the bed and flows upward through the biomass bed. The fluid is continuously in motion in the reaction vessel due to gas flows that find their way upwards through the fluid towards the liquid level.

In the known embodiment, near the top of the reaction vessel, the water phase is separated from sludge solids and gas in a three-phase separator (also known as a gas-liquid-solids separator) or solids separation device. EP 2 065 344 A1 discloses a solids and gas separation device comprising a solids collection chamber. Fluid from the process or reaction chamber can enter the separation device and the solids collection chamber. The separation efficiency is higher in conditions of a relatively low turbulence. Alternative solids separation devices, not necessarily comprising a solids collection chamber, are known, such as whirlpool devices and sieves.

In the known embodiment, separated fluid with solids from the solids separation device are transported back to the reactor, where due to density differences a downward flow is initiated. In the lower part of the reactor the fluid will mix with the sludge or with influent. Gas bubbles, for example formed in the anaerobic processes, in the fluid cause an upward transport. In this manner, a circulation of fluid flows is established inside the reaction vessel.

A drawback of a known purifier with a solids separation device is that the fluid that is being separated in the solids separation device comprises gaseous components, or bubbles, that rise upwards and create turbulence. These bubbles can also give the heavier sludge particles an unwanted upward lift, which interferes with the separation process in the solids separation device. This effect is known as "sludge flotation" or simply "flotation". These drawbacks limit the efficiency of a solids separation device to separate sludge from other liquids and gases, and thus limit the functioning of a purifier.

According to the prior art the sludge bed in the reactor should be sufficiently far below the solids separation device so that the separated particle matter in the solids collection chamber can drop down through the liquid into the sludge bed. If the sludge bed effectively surrounds the solids separation device, this dropping down effect would not occur, and the solids separation device would fill up with particulate matter and stop functioning. As such, known solids separation devices place specific demands on the level of the liquid and the sludge bed during operation, reducing the freedom of the designer of a purifier.

Installing the solids separation device near the top of the reaction vessel is a further drawback, complicating the construction of the reactor.

EP 0 493 727 discloses a combination UASB and mechanical purifier having an external whirlpool separation device connected to an external pipe. Internally, the purifier reactor bottom forms a mechanical separation device that allows particulate matter to settle in a settling chamber underneath the mechanical separation device. The particulate matter cannot traverse the mechanical separation device in the opposite, upward, direction. A drawback of this system is that two distinct types of separation devices are used, and that the external separation device requires pipes going through the reactor vessel. Moreover, sludge will settle in the settling space below the influent lines where the sludge no longer interacts with the influent material, so that the efficiency of the anaerobic processes is not optimal

SUMMARY OF THE INVENTION

It is a goal of this invention to improve a known purifier. It is a further goal of this invention to provide an improved method for purification of wastewater. It is a further goal of this invention to provide a lower cost purifier.

A goal is reached by providing a purifier for the purification of a fluid such as wastewater, the purifier comprising:
  a reaction vessel for a fluid, the reaction vessel having a reaction chamber and a bottom;
  a downer having a top end and a bottom end, wherein the top end of the downer is connected to a fluid collector to collect fluid from the reaction vessel, and the downer is arranged to transport the fluid towards the bottom of the reaction vessel;
  a solids separation device arranged to separate solids from liquid, the solids separation device comprising a fluid inlet arranged to introduce fluid into the solids separation device and a liquid discharge arranged to remove separated liquid from the solids separation device;
wherein the fluid inlet of the solids separation device is connected to the bottom end of the downer and the solids separation device is located on or near the bottom of the reaction vessel. The solids separation device may be placed inside the reactor vessel. The device may be placed on the bottom of the vessel so that in operation the sludge bed surrounds the solids separation device.

Therefore, in an embodiment the purifier comprises a reaction vessel, a downer and a solids separation device. The reaction vessel is arranged to contain a fluid. The reaction vessel has a reaction chamber and a bottom. In an embodiment the downer is arranged to collect fluid from the reaction vessel and transport the fluid towards the reactor vessel bottom. In an embodiment the solids separation device comprises a house having a fluid inlet for supplying fluid into a solids collection chamber of the solids separation device. The solids separation device further comprises a particulate material separation arrangement, arranged to separate solids and liquid material in the fluid from each other. In an embodiment the solids separation device further comprises a liquid discharge for removing fluid, in particular separated liquid, from the solids separation device, the liquid discharge being positioned downstream from the particulate material separation arrangement. In an embodiment, the solids separation device is located on the bottom of the reactor vessel. In a further embodiment, the solids separation device is located near the bottom of the reactor vessel, e.g. in a lower part of the reactor vessel supported by support legs or suspended from a vessel wall. This advantageously allows for a construction wherein the downer can run essentially vertically with a top end of the downer in an upper part of the reaction vessel, and a bottom part of the downer in a lower part of the reaction vessel. When the solids separation device is placed on the bottom of the reaction vessel, this advantageously gives the largest height difference between the top end of the downer, where fluid is collected, and the solids separation device where the fluid is separated. Furthermore, a placement of the solids separation device on or near the bottom or floor of the reaction chamber or vessel is constructionally advantageous, since placing the device on a surface is easier to arrange than placing the device at a height, as is required in prior art examples. A further advantage of placing the solids separation device on the bottom of the purifier, in particular on the bottom or floor of the reaction vessel, is that the area for the sludge bed to rest on is decreased, which improves the mixing of fluid with the sludge near the bottom of the reaction vessel. Yet another advantage of placing the solids separation device in the lower parts of the purifier lies in the fact that the separated particulate material will be re-introduced into the reaction vessel in said lower parts. This advantageously allows the sludge bed to filter said material, and tends to prevent the material from immediately rising back towards the fluid level. An advantage of placing the solids separation device inside rather than outside the vessel is that the pressure inside the solids separation device and in the surrounding part of the vessel is equal, so that there is no need to fortify the solids separation device to handle pressure differences. Another advantage is that only vertical pipes are needed, also removing the need for horizontal pipes going outside and back inside the vessel. An advantage of having only vertical pipes is that the risk of clogging due to settling of solids is minimized.

In an embodiment the fluid inlet of the solids separation device is connected to the downer. The downer allows fluid from a higher level to be transported downwards and according to this embodiment it is this fluid that is fed to the solids separation device. Fluid material from near the top of the reactor has a lower proportion of (potential) gaseous dissolved material than fluid material near the bottom of the reactor.

It is an insight of the inventors that fluid near the top of the reactor, where according to prior art the solids separation device is located, is at a low hydraulic pressure compared with the mean hydraulic pressure in the reactor vessel, which leads to dissolved gaseous components to "relax" to form (micro) bubbles in the solids separation device which adversely affect the functioning of the solids separation device.

The fact that liquid or fluid at higher pressure can contain more dissolved gaseous components compared with liquid at lower pressure is advantageously applied in the current invention. By bringing the fluid into the solids separation device from a height (the difference in height between the top and bottom ends of the downer), fluid with a low proportion of (potential) gaseous material is introduced into the solids separation device. Advantageously, the flotation effect is thus much reduced, which improves the efficiency of the solids separation device. Advantageously, the invention allows a modular set up of a purifier, where the solids separation device can be constructed and possibly sold separate from the reaction vessel.

In an embodiment, the solids separation device has an effluent line for removing fluid from the separation device. The effluent line can be connected to a pump, so that in operation the pump causes an essentially constant flow through the effluent line, resulting in a suction effect on the solids separation device. Due to the suction effect, material is extracted from the downer into the separation device at a steady pace, which is beneficial for the functioning of the solids separation device.

In an embodiment according to the invention, the solids separation device comprises a solids collection chamber arranged to receive separated solids. The solids separated from the fluid by the solid separation device, in particular by the particulate material separation arrangement of said device, may be advantageously collected in the solids collection chamber prior to being reintroduced into the reactor vessel.

In an embodiment according to the invention, the fluid pressure difference between the top end of the downer and the bottom end of the downer is at least 0.5 bar, preferably at least 1 bar. In an embodiment, the pressure difference is at least 1.5 bar, 2 bar, or 2.5 bar.

In an embodiment according to the invention, the purifier comprises a gas separation device, the gas separation device having a fluid outlet that is connected to the fluid collector. Advantageously, the gas separation device, which in an embodiment is located near the fluid level of the purifier in operation, will remove gaseous material from the fluid, further reducing the gaseous content of the fluid that is subsequently collected and brought towards the solids separation device by the downer. The gas separation device may be placed below the level of the fluid surface of an operational purifier. The gas separation device may be located below an overflow device of the purifier. In particular, it is advantageous to connect the downer to a gas separation device below the fluid surface, since a direct connection of a downer to an overflow device may introduce undesired gas bubbles into the downer.

In an embodiment according to the invention, the solids collection chamber is provided with means for removing collected or received material from the solids collection chamber. By actively removing collected material, it is prevented that the solids collection chamber, for example a solids collection chamber inside a hopper in the lower part of a solids separation device, fills with particulate material thus interfering with the flow from the solids collection chamber to the particulate material separation arrangement. The solids collection chamber comprises one or more exits for fluid containing particulate material for return into or in the direction of the reaction chamber. Separated, in particular solid, material is recirculated into the reaction vessel. Exits can be formed in a wall of the solids collection chamber by openings for removing fluid and sludge from the solids collection chamber into the reaction vessel of the purifier.

In an embodiment according to the invention, the means for removing separated material comprise branch segments in fluid connection with a fluid inlet system. The branch segments, which may be formed as pipes, have open ends inside the solids collection chamber which can take in collected material from the chamber.

In an embodiment, particulate material is removed from a solids collection chamber of the solids separation device by a suction effect created by a further flow of influent or a mixture of recycled and influent fluid into the reaction chamber. In an embodiment according to the invention, the fluid inlet system comprises injection parts such as jet-pumps or nozzles arranged to cause a suction effect through the branch segments. The jet-pumps may be formed as outlet openings of pipe segments, where the pipe segments have a constriction just before the opening. When fluid flows through the pipe segments and the outlet openings, the pressure at the constriction will be reduced. By connecting the branch segments to the pipe segments near the constrictions, the reduced pressure under operating conditions will cause a suction effect that causes material, such as collected particulate material, to be sucked into the branch segments. The material is then also emitted from the injection parts into the reaction chamber.

The inlet system thus serves at least two purposes. It brings influent or a mixture of influent and recycled material into the reactor chamber, and in doing so, the transport of the material from the outlet opening will cause a suction effect that sucks particulate material, that has been separated by the particulate material separation arrangement, out of the solids collection chamber. In an embodiment where the solids separation device is placed inside a reaction vessel or reactor chamber, the particulate material will thus be introduced into said chamber. Advantageously, the particulate material can be directly brought into the sludge bed in a reactor chamber, for optimal mixing of the particulate material with the sludge. A further advantage of such a solids separation device is that, provided the suction is strong enough, it can function while being effectively surrounded by or even submerged in the sludge bed of a reaction vessel.

The incoming influent will effectively behave like a fluid or water jet, which will exert a suction force on the particulate material that collects near the lower side of the solids separation device, thus helping to remove said material from the solids collection chamber. Due to this effective removal of collected particulate material, which functions even if the solids separation device is embedded in the sludge bed, it is no longer necessary to place the solids separation device at a height above the sludge level. An advantage is that the construction of a purifier utilizing such a solids separation device is simplified, since the reaction chamber or the reactor vessel of the purifier is not required to support a solids separation device at a height above the sludge bed.

In an embodiment a portion of the effluent from the liquid discharge is reintroduced, preferably reinjected, into the reactor vessel together with influent as a feed of the jet pump.

In an embodiment according to the invention, the solids separation device comprises angled wall parts that, going from top to bottom, taper outwards towards the sides of the reaction vessel. Advantageously, these angled wall parts can form a tent-like structure inside the reaction chamber or reaction vessel. Sludge that descends from higher parts of the reaction chamber may slide off the angled wall parts in the direction of the influent nozzles, thus minimizing the risk of unmixed zones on the bottom of the reactor.

In an embodiment according to the invention, the purifier comprising a plurality of solids separation devices. Advantageously, particularly for larger reaction vessels, a plurality of smaller solids separation devices may work more efficiently than a single large solids separation device.

In an embodiment according to the invention, the particulate material separation arrangement comprises a row of oblique parallel plates forming channels. The row of oblique plates functions as a particulate material separation arrangement. The channels formed by these plates, separate fluid that passes through them. Particulate matter will tend to flow downwards, while liquid materials tend to flow up the oblique channels. In an embodiment according to the invention, the oblique parallel plates of the particulate material separation arrangement are constructed and arranged to cause a flow in the upward direction from the solids collection chamber to the liquid discharge of the solids separation device. The particulate or sludge-like material is collected in the solids collection chamber while the recycled, cleaned, liquid material can be discharged from the solids collection chamber and eventually from the purifier via the liquid discharge. In an embodiment the solids collection chamber is positioned under particulate material separator. In this manner the inlet flow into the solids collection chamber is directed opposite to the exit or outlet flow towards the liquid discharge. The inlet and outlet flows will result in a circulating flow in the solids collection chamber.

In an embodiment according to the invention, a pump is provided to pump influent or a mixture of influent and effluent fluid from the liquid discharge of the solids separation device into the reaction chamber via an inlet system. Advantageously, the pump creates the necessary water jet to create underpressure and remove separated particulate material from the solids collection chamber into the reactor chamber.

The use of a pump in combination with a particulate material separation arrangement comprising oblique plates is advantageous, since the pump will cause the fluid to flow at an essentially constant rate over the plates, which is beneficial for the functioning of the oblique plates.

In an alternative embodiment, the downer can collect fluid from the vessel and run partially external from the vessel. The solids separation device can be positioned in the external path of the downer.

The invention provides a solids separation device which is formed and arranged for use in a purifier according to the invention as described above.

The invention further provides a method for the aerobic or anaerobic purification of a fluid of wastewater using a purifier, the method comprising the steps of:
  raising the hydraulic pressure in an amount of fluid from a reaction chamber of the purifier from a first pressure value to a second pressure value, said second pressure value being higher than the first pressure value;
  separating particulate material from the amount of fluid; and
  reintroducing the separated particulate material into the reaction chamber.

The purifier can be a purifier as described above. A solids separation device as described above may be used to separate solids from liquids. It is advantageous to raise the pressure of the fluid to be (at least partly) separated into particulate liquid material prior to the step of separation because of the above mentioned flotation effect that occurs in solids separation devices. This improves the efficiency of the solids separation device.

In a further embodiment according to the invention, raising the hydraulic pressure comprises the step of transporting the amount of fluid from a first location in the reaction chamber to a second, lower, location in the reaction chamber, for example using a downer as described above. In an embodiment, the second pressure value is at least 0.5 bar, preferably at least 1 bar higher than the first pressure value.

In an embodiment according to the invention, the step of raising the hydraulic pressure in an amount of fluid is preceded by separating an amount of gas from said amount of fluid. By at least partially removing the gas from the fluid, the flotation effect in a subsequent particulate material separation step will be further reduced.

In an embodiment according to the invention, the step of reintroducing particulate material into the reaction chamber comprises removing the particulate material from a solids collection chamber of a solids separation device by a suction effect created by a further flow of influent or a mixture of recycled and influent fluid into the reaction chamber. Advantageously, this measure both introduces new fluid material to be cleaned into the purifier, and it simultaneously serves to flush the particulate material that has collected or is being received in the solids collection chamber out of the solids separation device into the reaction chamber of the purifier, thereby disturbing the sludge bed and improving the mixing. In a further embodiment according to the invention, particulate material is removed from a solids collection chamber of the solids separation device by a fluid jet.

BRIEF DESCRIPTION OF THE DRAWINGS

Aspects of the invention will now be described in reference to FIGS. 1-3, wherein FIG. 1a-1b schematically show a purifier according to the invention, FIGS. 2a-2c schematically show a solids separation device of a purifier according to the invention, FIG. 3 schematically shows a fluid collector and gas separation device of a purifier according to the invention, FIG. 4 schematically shows an alternative influent inlet arrangement according to the invention, and FIG. 5 schematically shows another variation according to the invention.

DETAILED DESCRIPTION OF THE INVENTION

Figure 1A:
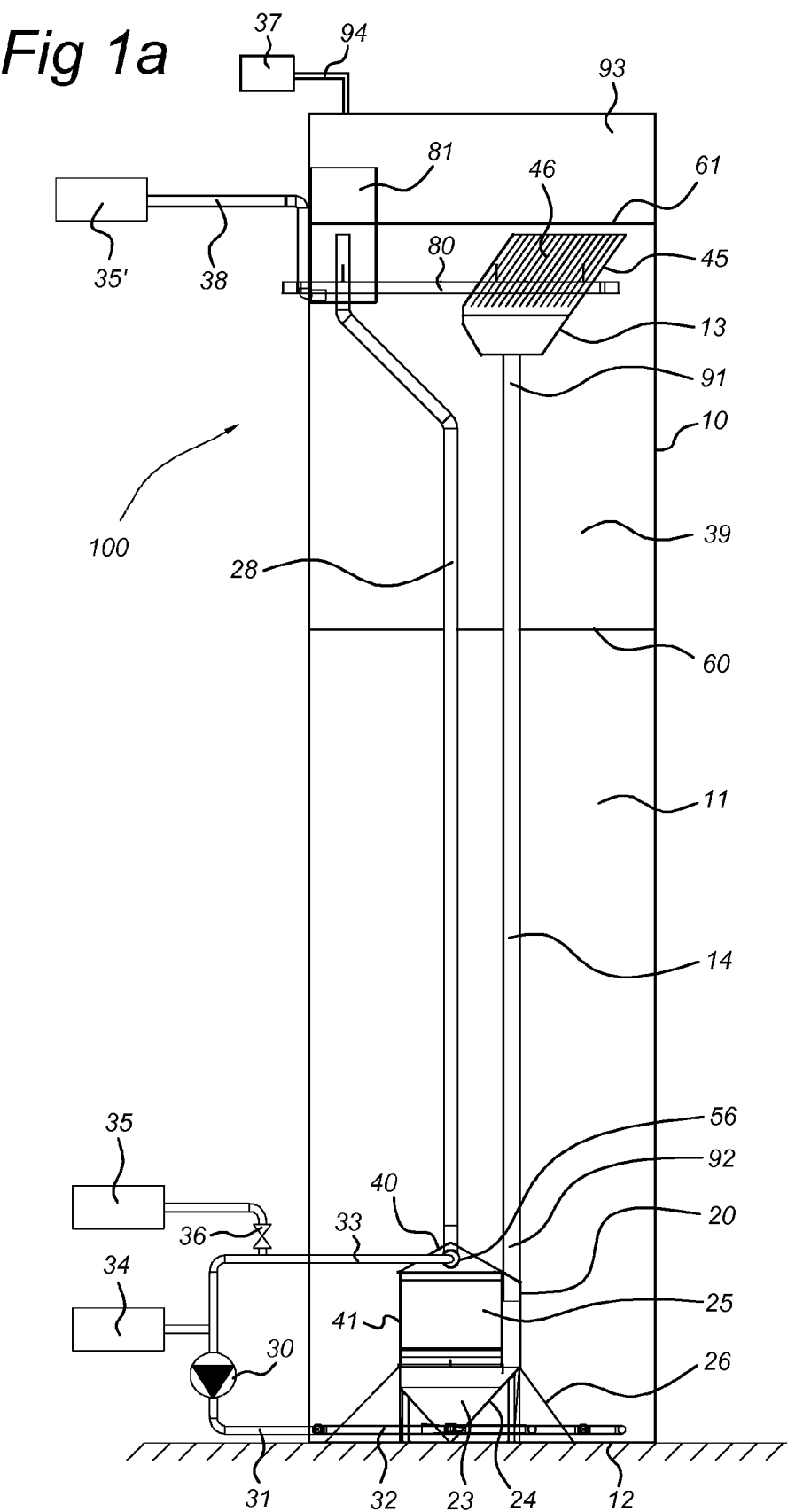
Figure 1B:
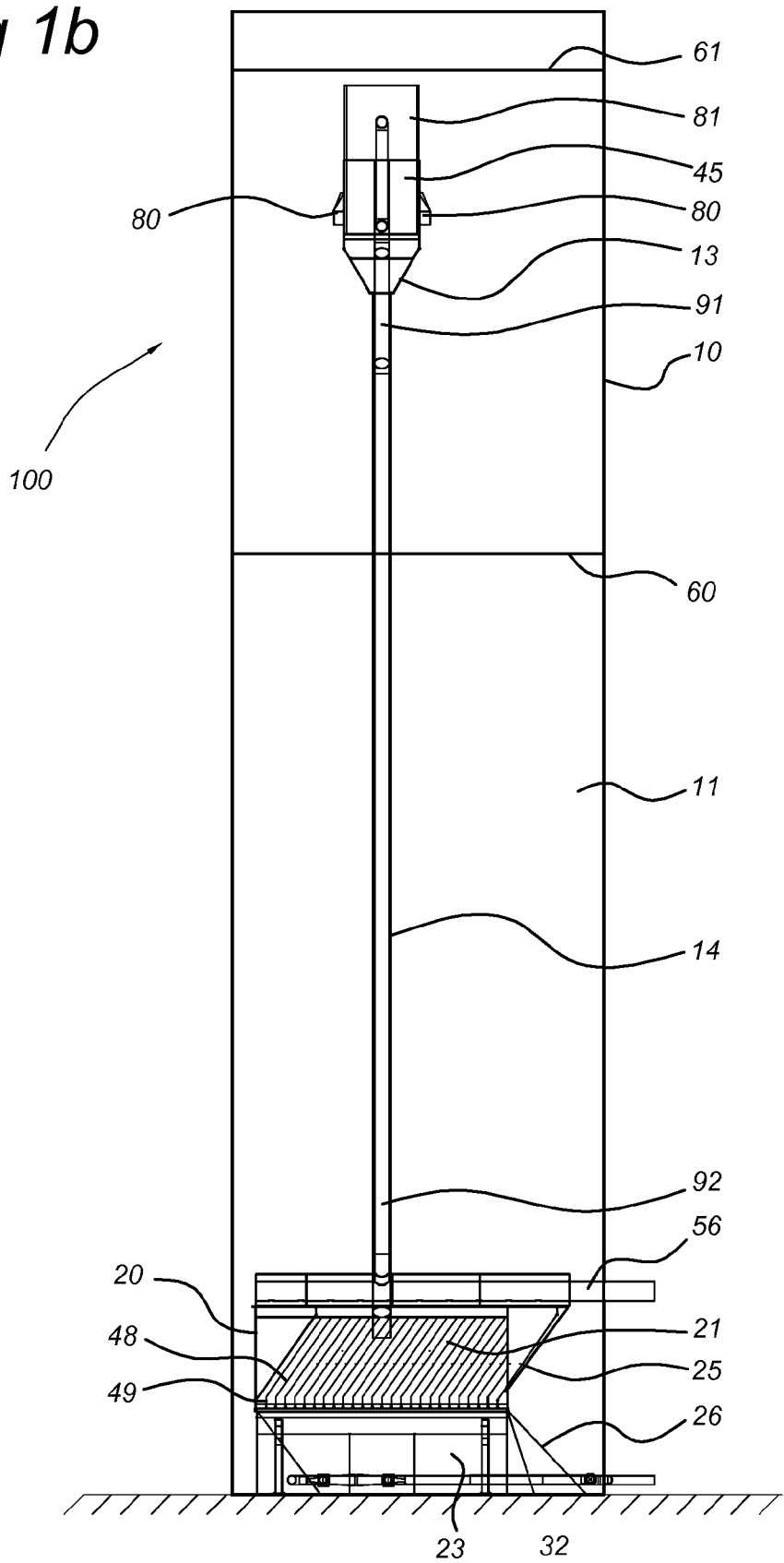

Referring to FIGS. 1a and 1b, the purifier 100 comprises a reaction vessel 10. The reaction vessel 10 is provided with an inlet system 32 for introducing influent into the purifier, and an outlet line 33 for removing recycled liquid or effluent from the purifier. The purifier 100 further comprises a biogas outlet line 94 for removing biogas separated from the fluid in the reaction vessel to a biogas unit 37, where the biogas is collected or utilized.

Influent source 34 is connected via a fluid line to influent line 31. Pump 30 is connected to influent line 31, and, in operation, causes the mixture of influent from influent source 34 and the effluent from outlet line 33, which is connected to influent line 31, to be transported via influent line 31 to the inlet system 32 and thus into the reaction vessel 10. In an alternative arrangement, not shown in FIG. 1, influent source 34 is connected to the influent line 31 downstream of pump 30.

Effluent pipe 28 connects effluent collection line 56 to the degassing/waterlock vessel 81 situated in the upper parts of the reactor, near the fluid level in operating conditions. In this effluent pipe 28 and vessel 81 the fluid "relaxes" and dissolved gas will form bubbles that will escape from vessel 81 to the headspace 93 of the reactor. Vessel 81 together with the connecting effluent piping 83, 84 and 38 (see FIG. 3) serves as a water lock to avoid gas from the headspace escaping with the effluent leaving the reactor, for example via effluent removal line 84 and 38 to collection unit 35'. Effluent may be allowed to leave the reactor via effluent removal lines 84 and 38 to collection unit 35'. Gas produced in the solids separation device 20 or entrained therein via the downer 14 (see below) will be directed to the headspace 93 of the reactor by pipe 28, but the vessel 81 will prevent this gas from entering the effluent removal line 84. In the top of the reaction vessel, a biogas outlet line 94 is arranged, where biogas can be removed from the headspace 93 to enter biogas collection unit 37.

Also connected to the outlet line 33 is a branch line with adjustable valve 36, which can be partially opened and closed. In opened position, some of the effluent material will be brought from the outlet line 33 via the branch line to the effluent collection unit 35. Not all the effluent material will thus be mixed with the influent material coming from the influent source 34. If the influent material from the influent source 34 comprises too much contamination (e.g. sludge-like or particulate material, or other bio-degradable components), the purifier may not work optimally. Advantageously, the influent material is diluted to such an extent by mixing it with effluent fluid, that an optimal mixture is brought into the purifier.

Effluent may thus be removed from the reactor going from collection line 56 via the effluent pipe 28 or via the outlet line 33. Alternative embodiments using either or both of these options are possible. Furthermore, embodiments with and without a mixing-in of effluent with influent as described above are possible. Effluent collection units 35 and 35' may be carried out as a single unit.

The inside of the reaction vessel 10 of the purifier comprises the reaction chamber 11. Under operating conditions, the reaction vessel contains a fluid, the fluid having a fluid level 61 and comprising, below the fluid level, a sludge bed 60. In the reaction chamber 11, in particular in or near the sludge bed 60, the wastewater can react, in the current example in an anaerobic way, to form gas and a relatively small amount of biological sludge or particulate matter.

The mixture of gas, liquid and particulate matter can flow freely inside the reactor vessel 10. The flow can be driven by density differences in the fluid. Lower densities will rise to the surface. In some occasions gas can stick to (heavier) particulate matter, resulting also in the rise of particulate matter to the surface 61. The result of the (bio)chemical reactions in the reaction chamber 11 are turbulent flows in the fluid.

In the embodiment shown in FIG. 1, a solids separation device 20, comprising a separation vessel 25, is placed inside the reaction vessel 10. A downer 14, formed as a pipe, runs vertically from an upper part, above the sludge bed, of the reaction chamber 11 to a lower part of the reaction chamber 11 where it is connected to the solids separation device 20. The solids separation device 20 is illustratively placed on the bottom 12 of the reaction vessel 10.

Preferably, the solids separation device 20 is placed in a lower part of the reaction chamber 11, where higher pressures prevail than in a higher part of the reaction chamber 11. The solids separation device 20 may be located such that under operating conditions it is fully or at least partly surrounded by the sludge bed 60. The solids separation device 20 comprises a particulate material separation arrangement 21 and a solids collection chamber 23, where separated particulate material is collected. In the current example the solids collection chamber 23 is located inside hopper 24 in the lower part of the separation vessel or house 25 below the particulate material separation arrangement 21. The solids collection chamber 23 is provided with means for bringing the collected material back into the reaction chamber 11.

Various particulate material or solids separation arrangements 21 are available to the skilled person. In the present examples, a material separation arrangement based on oblique parallel plates (48) will be described. However, alternative solids separation arrangements may be applied according to the invention, such as whirlpool arrangements or sieves.

The top end 91 of the downer 14 is connected to a fluid collector 13 located in a top part of the reaction chamber 11. If the purifier is operated with a sludge bed, the top end 91 and the fluid collector 13 should be located above the sludge bed level 60. The purifier may also work in a mixed mode, i.e. the reaction vessel comprising fluid essentially without a sludge bed. The bottom end 92 and the solids separation device may be located below the sludge bed level, however, the purifier will also function if they are located above the sludge bed level 60 as well. The fluid collector 13 is arranged to collect fluid from a top part of the reaction chamber 11, where lower pressures prevail than in a bottom part, and to transport this fluid into the downer 14 towards the solids separation device 20. This fluid transport effect may be obtained with the help of gravity and/or a suction force from the downer 14. Connected to the fluid collector 13 is a gas separation device 45. The gas separation device 45 is arranged to take in fluid from near the fluid level 61 and separate gaseous material from other fluid components. The gaseous material will be guided to the headspace 93 of the reactor and finally out of the reactor via the biogas outlet line 94.

Exemplary components and embodiments of the purifier 100 will now be discussed in some more detail, referring to FIGS. 1-3.

A downer 14 is formed as a pipe for fluid material 39, the downer having a top end 91 and a bottom end 92. The downer 14 is arranged to guide fluid flows in the reaction vessel 10. The downer 14 is arranged to allow a recirculation flow of fluid in the vessel. Degassed fluid from near the fluid level 61 is transported to a lower level in the reaction vessel 10.

The bottom end 92 of the downer 14 is connected to a fluid inlet of the solids separation device 20. In the solids separation device 20 shown in FIG. 2b or 2c, the downer 14 protrudes a flat roof of an inlet section 72 of the separation vessel 25. Next to the inlet section 72, which forms the fluid inlet of the solids separation device 20 in the current example, the separation vessel 25 comprises a solids collection chamber 23, which in the current example is in a settling section 73 separated from the inlet section 72 by a partition 71 that runs from the roof of the separation vessel 25 downwards. Fluid may flow from the downer 14 into the inlet section 72, then flow under the partition 71 to enter the settling section 73 via solids collection chamber 23. Solids may be separated in settling section 73 and flow back to solids collection chamber 23.

Alternative arrangements are possible. The partition 71 may be absent, so that the fluid from the downer can easily flow into the settling section 73 from the inlet section 72. In a further example, the inlet section 72 may be absent, and the downer may protrude through the roof part 40 of the solids separation device 20 into the solids collection chamber 23. In the current example the roof part 40 of the solids separation device 20 is shaped like a gable roof, with angled, non-horizontal, roof parts on which the sludge cannot easily settle. Advantageously, the sludge will slide off the angled roof parts.

The separation vessel 25 in FIGS. 2b and 2c has vertical walls parts 41 that run vertically below the roof part 40. The lower half of the separation vessel 25 in FIG. 2b has angled wall parts 26 that, going from top to bottom, taper outwards (diverge) towards the sides of the reaction vessel 10. An advantage of these angled wall parts 26 is that sludge does not easily settle on it, but rather slides down it under the influence of gravity. In an advantageous variant, the sludge slides in the direction of the mixing nozzles. The movement of the sludge improves the mixing of the sludge with influent material and thus improves the anaerobic reactions. FIG. 2c shows an example without the angled wall parts 26, so that the hopper 24 and the support legs 29 of the separation vessel 25 are visible. An advantage of the alternative without angled wall parts 26 is that the footprint of the device is smaller, so a smaller mechanical load has to be carried by the settler-unit. Especially in embodiments utilizing multiple solids separation devices 20 distributed over the bottom 12 of the reaction chamber 11, this may be especially advantageous. Thus, in an embodiment two or more solids separation devices and downers are arranged in a single vessel 10.

Inside the separation vessel 25, mainly surrounded by the vertical wall parts 41, is a particulate material separation arrangement 21, an example device being illustrated schematically in FIGS. 1b (side view), 2a (top view), and 2b and 2c (perspective). The fluid from the downer 14 is introduced into the separation vessel 25 at a point upstream from the particulate material separation arrangement 21. The fluid is introduced in the solids collection chamber 23 or at a point upstream from the solids collection chamber 23, such as an inlet section 72 from where it is guided towards the solids collection chamber 23 and the particulate material separation arrangement 21. Preferably the fluid is introduced into the solids collection chamber 23 next to or below the particulate material separation arrangement 21.

The example particulate material separation arrangement 21 in FIG. 1b comprises a stack of oblique plates 48. The oblique plates 48 have a vertically oriented lowermost parts 49. In the current example, the particulate material separation arrangement 21 has the effect of bringing some of the liquid material that is brought into the separation vessel 25 via the downer 14 to the top of the separation vessel 25, underneath the roof part 40, where it will flow via the effluent collection line 56 to outlet line 33. Some of the particulate material will be brought by the particulate material separation arrangement 21 back into the solids collection chamber 23 of the separation vessel 25.

Figure 2A:
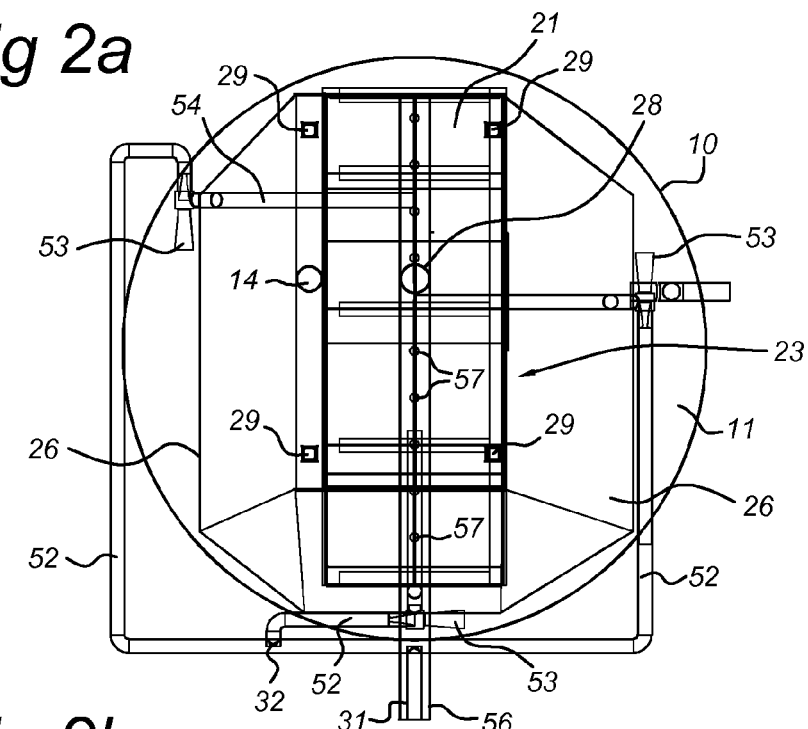
Figure 2B:
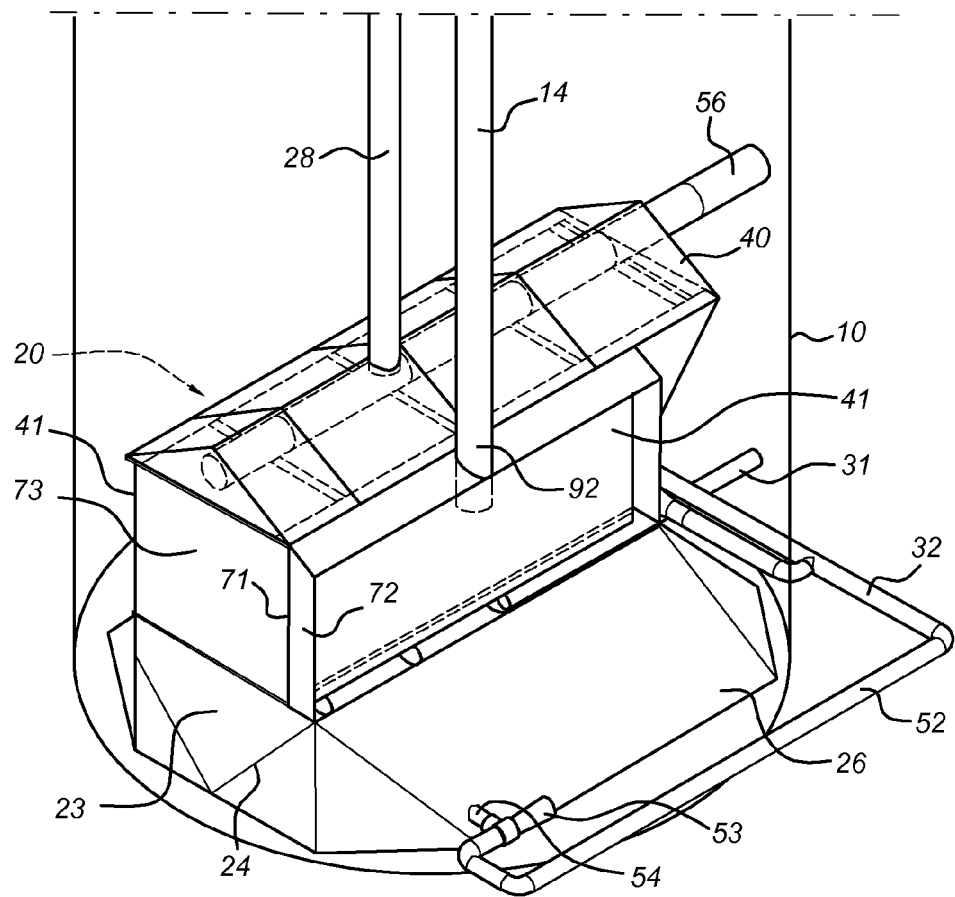
Figure 2C:
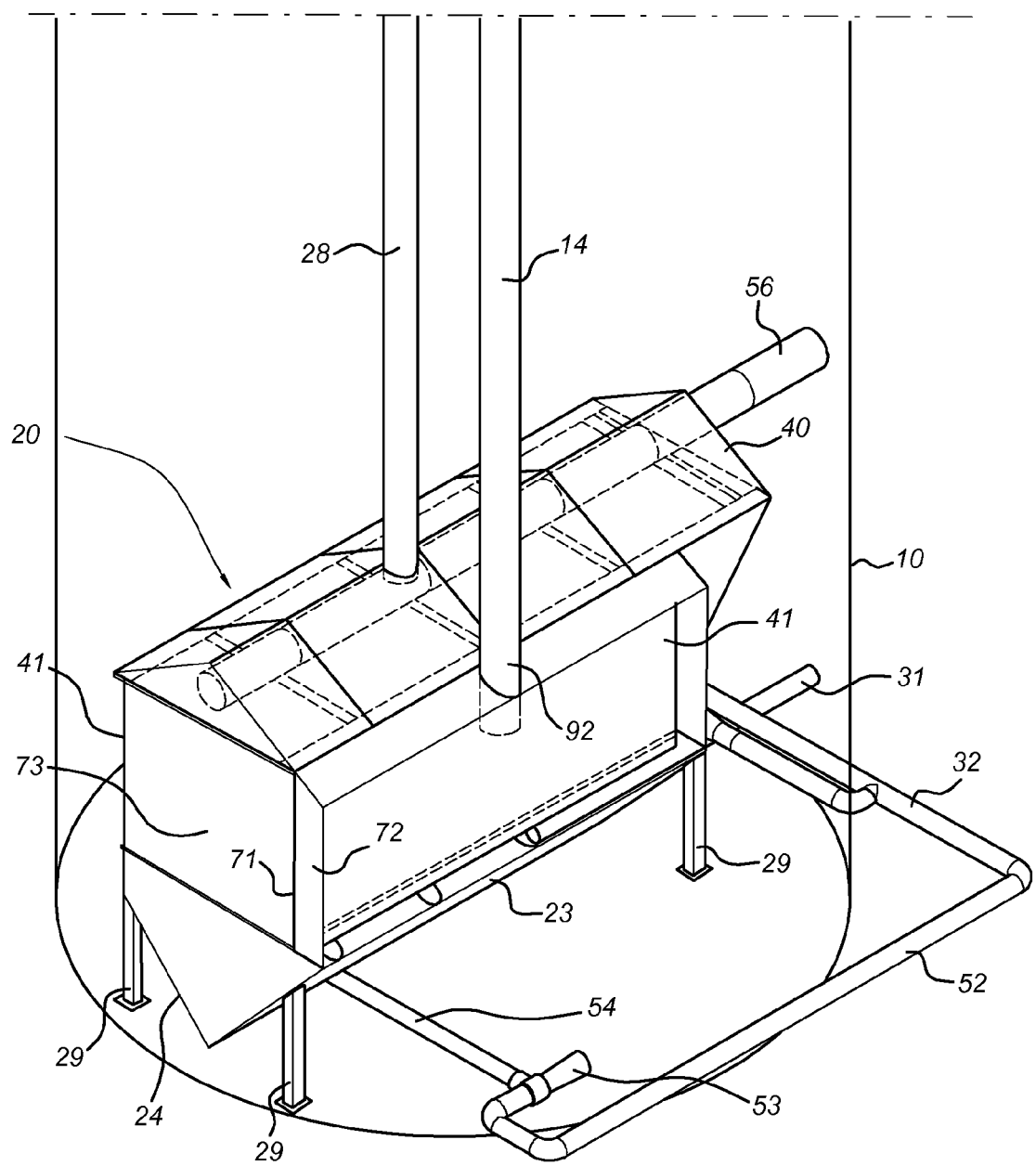

The solids separation device 20 according to the embodiment of FIG. 2a comprises a liquid discharge pipe 56 for discharging liquid from the upper parts of the separation vessel 25. The discharge pipe 56 is provided with entrance holes 57 that allow liquid in the solids separation device 20 to flow into the pipe. The discharge pipe 56 is connected to the outlet line 33. The amount of liquid discharged from the solids separation device 20 can be controlled or manipulated using pump 30. Connected to the discharge pipe 56 is effluent pipe 28, which is arranged to also carry away effluent. In addition, the effluent pipe 28 can carry away gaseous components of the fluid that may otherwise collect in the discharge pipe 56 or elsewhere in the solids separation device 20. The effluent pipe 28 has an open ending section 83 in effluent vessel 81 (shown in FIG. 3). An effluent pipe 28 is but one way of dealing with gaseous components in the solids separation device 20. Alternative arrangements may utilize an exhaust valve or other pressure relieving device. As was remarked before, both effluent lines, outlet line 33 and effluent pipe 28, need not be present. A functioning purifier can be arranged by providing either one of these two lines, or both lines.

The inlet system 32 shown in FIG. 2a comprises a number of pipe segments 52 that receive influent material from the influent line 31. At endpoints of pipe segments 52, nozzles or jet-pumps, or, generally, injection parts 53 are provided. Near the injection parts 53, branch segments 54 are connected to the pipe segments 52. The branch segments 54 protrude at least partially inside the solids collection chamber 23 (in the current example inside the hopper 24). The injection parts 53 are arranged so that when fluid flows through the injection parts 53 into the reaction chamber 11, a suction effect will suck in material through the branch segments 54. In the exemplary embodiment of FIG. 2a, three branch segments 54 are arranged so that they may suck in settled material from three locations in the solids collection chamber 23 and bring the material back into the reaction chamber 11 via injection parts 53.

Figure 3:
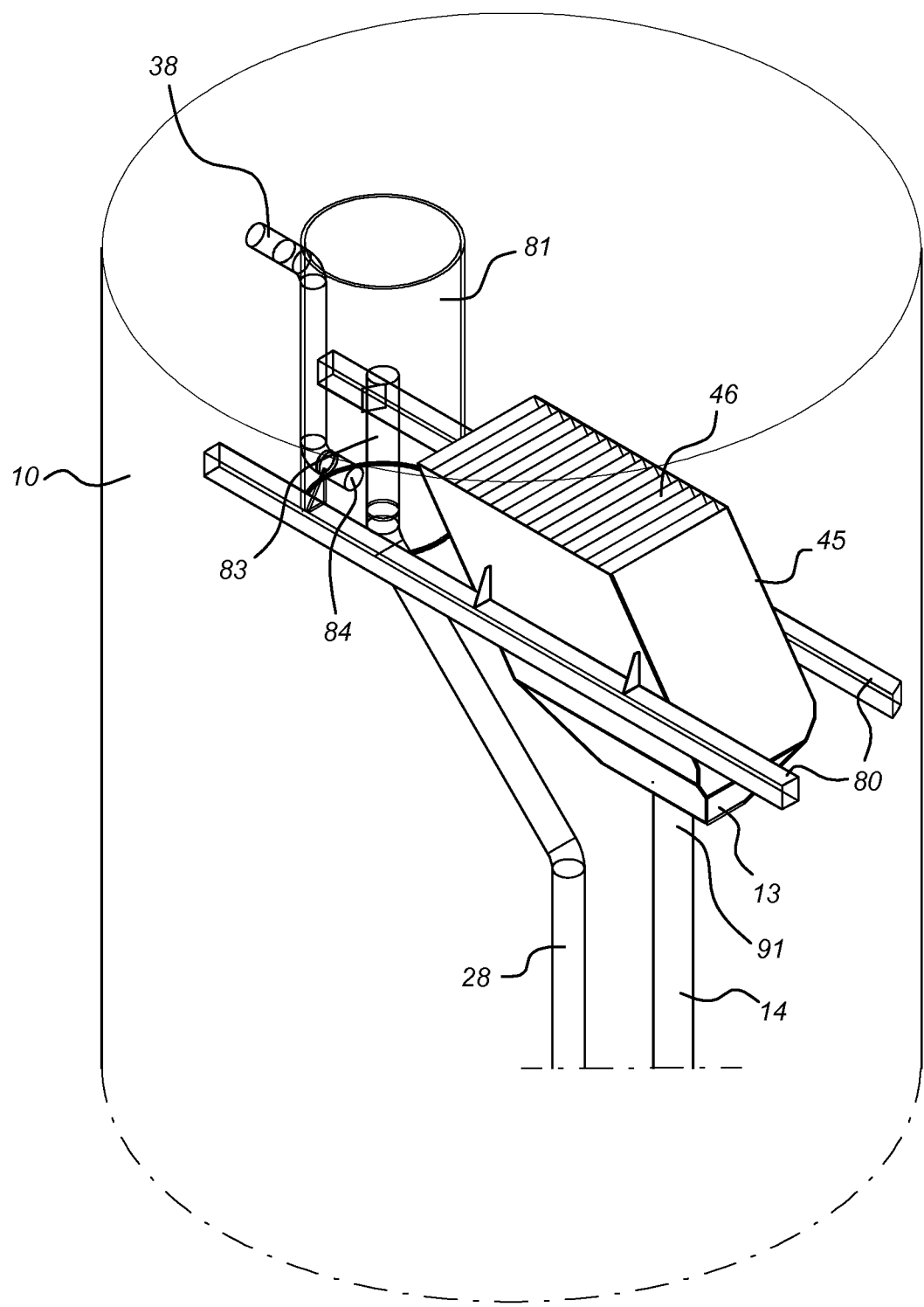

In the example of FIG. 3, the gas separation device 45 on top of the fluid collector 13 has channels formed between oblique plates 46. The oblique plates 46 are positioned in an overlapping arrangement. The gas separation device 45 is supported by bars 80 which are connected to the reaction vessel 10 walls. The oblique plates 46 of the gas separation device 45 are arranged so that when fluid flows through the channels formed between the plates, the gaseous elements tend to drift upwards, to be eventually guided to the headspace 93 of the reactor and finally to the biogas outlet line 94.

The operation of the purifier is as follows. Under operating conditions, the reaction chamber 11 is filled with fluid material 39. Preferably, the fluid level 61 of the fluid material 39 is just above the fluid collector 13 and well below the outlet for the biogas outlet line 94. This way, the biogas can escape the fluid material 39 to be collected in the part of the reaction chamber 11 above the fluid level (headspace 93) and then exit the purifier via the biogas outlet line 94. The fluid material from the top of the reactor is eventually collected in the fluid collector 13 and brought into the solids separation device 20 for separation into liquid and particulate material. The fluid material comprises a bed of anaerobic sludge. Due to its higher relative weight, the sludge material will be mostly located in the lower parts of the reaction chamber 11.

Influent material, for example industrial wastewater that is to be cleaned, is pumped by pump 30 from the influent source 34 via influent line 31 to the reaction vessel 10. Before entering the vessel, the influent material mixes with effluent material from outlet line 33. The mixture enters the vessel via the inlet system 32, and streams through jet-pumps or more generally injection parts 53 into the reaction chamber 11. This stream of influent causes a suction force or effect that draws fluid material, in particular particulate material collecting in the solids collection chamber 23, out of the solids collection chamber 23 through branch segments 54 and injection parts 53 into the reaction chamber 11. Thus, advantageously, settled material is brought back into the sludge bed where the anaerobic processing can continue. This ensures that the solids collection chamber 23 will not become filled with collected separated material, even if the sludge bed effectively surrounds the entire solids collection chamber 23. Prior art solids separation devices, that lack the suction effect under operating conditions that helps remove collected material, cannot function in or under a sludge bed.

Preferably, the inlet system 32 is arranged so that the flow of influent material does not create turbulence or significant flow disturbances in the regions of the solids collection chamber 23 close to the particulate material separation arrangement 21.

In an embodiment, some or all of the injection parts 53 are underneath the angled wall parts 26. Where this is the case, under the obliquely positioned side wall parts 26 a more turbulent flow pattern prevails as a result of the influent flow. In an alternative embodiment, all injection parts 53 are outside of the angled wall parts 26, or the angled wall parts 26 are absent altogether.

The mix of influent material and sucked-in collected material from the solids collection chamber 23 that is thus introduced into the sludge bed will be processed in the sludge bed. During processing, gas bubbles will form that will rise through the sludge bed and the fluid material 39. The rising gas bubbles also keep the sludge and fluid in motion. Liquid components of the fluid will also tend to rise upwards due to their relatively lower weight compared to sludge and particulate materials in the fluid.

Liquid and gaseous materials eventually rise to near the fluid level 61 of the fluid material. Here biogas is separated from the fluid by the gas separation device 45, and the biogas is eventually removed from the reaction vessel 10 via biogas outlet line 94. Gas that escapes from the fluid through the fluid surface 61 is also collected in the biogas outlet line 94. The gas separation device 45 in the current example is provided with oblique plates 46 to separate gas from liquid. However, other means, particularly means without oblique plates, for separating gas from the fluid may be utilized as well.

The de-gassed fluid material, at this height in the reaction chamber 11 comprising mostly liquid material, will be collected in the fluid collector 13 and move through the downer 14 towards the solids separation device 20, where it will enter the upper region of the separation vessel 25. As was mentioned before, the fluid that has entered the separation vessel 25 will be separated in the particulate material separation arrangement 21. The device is arranged to operate in such a manner that in the lower part of the separation vessel 25, the solids collection chamber 23, sludge and particulate matter can collect, and in the higher part of the separation vessel 25, beneath the roof part 40, liquid material can collect for removal via outlet line 33 or 28.

The cleaned liquid can reach effluent outlet line 33 after passing through the solids collection chamber 23 and the particulate material separation arrangement 21. The movement of the liquid through oblique plates 48 of the particulate material separation arrangement 21 will be in the generally upward directions. The plates are arranged so that the settling particulate material will, due to friction with the plate surfaces, tend to drift back downwards towards the solids collection chamber 23 while liquids will tend to drift upwards towards the outlet line 33.

Flowing through the inlet section 72 the inflow of fluid will continue its flow motion into the solids collection chamber 23. From there, the fluid may flow through the particulate material separation arrangement 21. During the upward flowing of the fluid along the bottom surface of a channel between the oblique plates 48, a semi-laminar flow will be formed in which heavier particles still present in the fluid will be easily deposited and flow in a reverse direction, i.e. in the direction of the solids collection chamber 23. Other particulate material separation arrangement 21, for example not utilizing oblique plates 48, may be used in alternative embodiments of the invention.

In the exemplary embodiment, while the solids separation device 20 can release gaseous fragments through the effluent pipe 28, the solids separation device 20 is not particularly arranged to separate gas from fluid. This arrangement without a gas separation device in the solids separation device 20 is possible due to the fact that the downer 14 will supply fluid material with a relatively low gaseous content. In addition, the flotation problem known in prior art purifiers having a solids separation device 20 is much reduced due to the low gaseous content of the fluid from the downer.

The liquid that flows upwards through the channels formed between the plates 48, can enter discharge pipe 56 through entrance holes 57. The discharge pipe 56 is connected to outlet line 33 and 28. The discharge pipe 56 forms the liquid discharge of the solids separation device 20 and part of this liquid may be recycled to the influent system.

The solids collection chamber 23 is provided with means to remove the collected particulate material from the chamber back into the reaction chamber 11. In the current example, this means is implemented via branch segments 54 that are a part of the inlet system 32 and are arranged to suck in material from the solids collection chamber 23, so that it becomes mixed with influent material from the influent line 31 and enters the reaction chamber 11 through the injection parts 53.

In an alternative embodiment, the solids collection chamber 23 in the hopper 24 is provided with a exit slit through which the collected material may leave the hopper 24 to enter a mixing chamber underneath the angled wall parts 26. In this alternative embodiment, the nozzles or injection parts 53 of the inlet system 32 are also located underneath the angled wall parts 26 and are directed towards exit holes which are provided in the angled wall parts 26 of the mixing chamber. The outlet openings of the injection parts 53 are at a distance of the exit holes 54, so that the fluid exiting the injection parts 53 must traverse said distance through the mixing chamber before entering the reaction chamber 11 through the exit holes 54. The nozzles or injection parts 53 are designed and arranged, particularly relative to the exit holes 54, in such a manner that an optimal flow through the mixing chamber is established, with an appropriate suction effect to suck in particulate material from the mixing chamber which is then brought into the reaction chamber 11.

A solids separation device 20 according the invention can thus separate particulate material from liquid and, optionally, gaseous materials, has improved efficiency due to the reduced effect of flotation, and is provided with an arrangement that effectively removes the separated particulate material from the solids collection chamber 23. In contrast with prior art separation devices, said arrangement does not rely on the effect that heavier components of a fluid sink with respect to lighter components. An advantageous effect of the pump-driven arrangement is that the rate at which the particulate materials of the solids collection chamber 23 are flushed is controllable via the pump 30.

Figure 4:
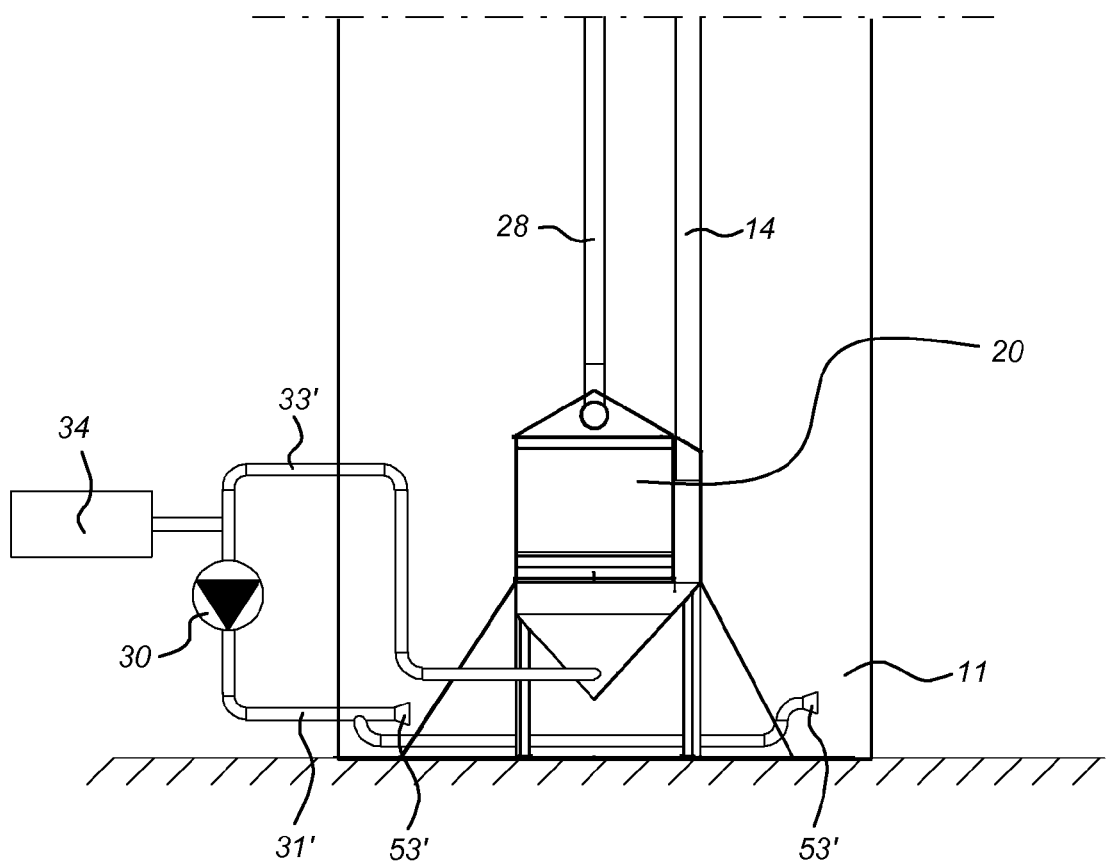

Instead of an inlet system 32 comprising a jet, also an external pump can be used to remove the sludge from solids collection chamber 23, as schematically depicted in FIG. 4. The suction line 33' of this pump is connected to the lower part of the solids collection chamber and water together with particulate material is mixed with reactor influent 34 branched in upstream or downstream from the pump. This combined flow is then pumped through line 31' into the reaction chamber 11 via influent nozzles 53'.

Figure 5:
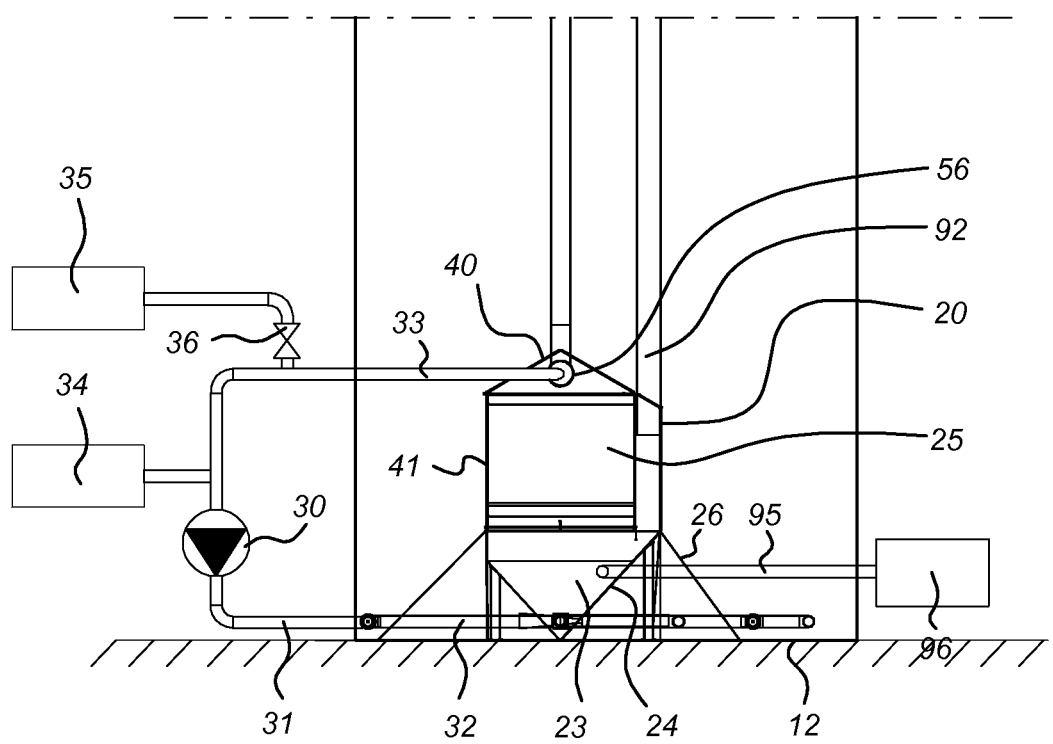

FIG. 5 schematically shows another variation according to the invention. In the solids separation device a gas-supply system 95 is mounted, in the example of FIG. 5, below the plates, so in the upper part of the solids collection chamber. Also in the lower part of the solids collection chamber 23 one or more gas injectors may be provided in order to stir up accumulated sludge. The gas supply system is arranged to supply a gas (eg nitrogen) from gas source 96 in order to clean the reactor internals. The supplied gas will cause high turbulence inside the solids separation device, which will clean the particulate material separation arrangement, for example the surface of the oblique plates. The gas will be collected in the effluent pipe 28 which will act as a riser and thus a gaslift pump. The suction effect of this gaslift pump will pull liquid through the degassing unit 46 into the downer and the inlet section 72 and due to the high liquid velocity during the gas supply, attached sludge will be flushed out. In addition, when a pipe or such is clogged with sludge it may be unclogged via this action.

The invention is not limited to the exemplary embodiment illustrated in the figures. A person skilled in the art may apply various modifications without departing from the scope of the invention. A skilled person may provide a particulate material separation arrangement 21 other than the exemplary oblique parallel plates, such as a whirlpool or sieve arrangement. In addition, the solids separation device 20 and/or at least a part of the downer 14 and/or effluent pipe 28 may be placed outside of the reaction vessel 10. This advantageously allows easy inspection and cleaning of the device. Furthermore, whereas most of the examples refer to anaerobic purification, the invention may also be applied to a purifier for aerobic purification.

The invention claimed is:

1. Purifier (100) for the purification of a fluid such as wastewater, the purifier comprising:
   a reaction vessel (10) for a fluid, the reaction vessel having a reaction chamber (11) and a bottom (12);
   a downer (14) having a top end (91) and a bottom end (92), wherein the top end of the downer is connected to a fluid collector (13) to collect fluid from the reaction vessel (10), and the downer is arranged to transport the fluid towards the bottom (12) of the reaction vessel;
   a solids separation device (20) arranged to separate solids from liquid, the solids separation device comprising a fluid inlet (72) arranged to introduce fluid into the solids separation device and a liquid discharge (56) arranged to remove separated liquid from the solids separation device;
   characterized in, that the fluid inlet of the solids separation device (20) is connected to the bottom end (92) of the downer, the solids separation device is located inside the reaction vessel, on or near the bottom (12) of the reaction vessel, and the solids separation device (20) comprises a solids collection chamber (23) arranged to receive separated solids, said solids collection chamber (23) comprising at least one exit (54) for bringing fluid from the collection chamber (23) to the reaction chamber (11).

2. Purifier (100) according to claim 1, further comprising an influent inlet system (32) for introduction influent into the reactor, wherein the influent inlet system (32) is configured to remove particulate material from the solids collection chamber (23) by a suction effect created through the influent introduction.

3. Purifier (100) according to claim 2, wherein the the fluid inlet system (32) comprises injection parts (53) such as jet-pumps or nozzles arranged to cause a suction effect through the branch segments (54).

4. Purifier (100) according to claim 1, wherein the liquid discharge (56) is connected to an effluent pipe (28) configured to transport the separated liquid to a degassing vessel (81) in an upper part of the reactor thereby removing gas produced in the solids separation device (20) or entrained therein via the downer (14) out of the solids separation device.

5. Purifier (100) according to claim 1, comprising a gas separation device (45), the gas separation device having a fluid outlet that is connected to the fluid collector (13).

6. Purifier (100) according to claim 1 wherein the solids separation device (20) comprises a row of oblique parallel plates (48) forming channels.

7. Purifier (100) according to claim 6, wherein the oblique parallel plates (48) are constructed and arranged to cause a flow in the upward direction from a solids collection chamber (23) towards the liquid discharge (56) of the solids separation device (20).

8. Method for the aerobic or anaerobic purification of a fluid of wastewater using a purifier (100) comprising a reaction chamber (11), the method comprising the steps of:
   raising the hydraulic pressure in an amount of fluid in a reaction chamber (11) of a purifier (100) from a first pressure value to a second pressure value, said second pressure value being higher than the first pressure value, by transporting said amount of fluid from a first location inside the reaction chamber (11) to a second, lower, location inside the reaction chamber (11);

separating particulate material from the amount of fluid in a solids separation device (20) located at said second location inside the reaction chamber (11); and reintroducing the separated particulate material from the solids separation device (20) into the reaction chamber (11).

9. Method according to claim 8, wherein the second pressure value is at least 0.5 bar, preferably at least 1 bar higher than the first pressure value.

10. Method according to claim 8, wherein the step of raising the hydraulic pressure in an amount of fluid is preceded by separating an amount of gas from said amount of fluid.

11. Method according to claim 8, wherein the step of reintroducing particulate material into the reaction chamber (11) comprises removing the particulate material from a solids collection chamber (23) of a solids separation device (20) by a suction effect created by a further flow of influent or a mixture of recycled and influent fluid into the reaction chamber (11).

12. Method according to claim 8, using a purifier (100) according to claim 1.

\* \* \* \* \*